(12) United States Patent
Nikitin et al.

(10) Patent No.: US 7,822,099 B2
(45) Date of Patent: Oct. 26, 2010

(54) DIGITAL GAUSSIAN NOISE SIMULATOR

(75) Inventors: Andrey A. Nikitin, Moscow (RU); Alexander E. Andreev, San Jose, CA (US); Igor A. Vikhliantsev, Sunnyvale, CA (US)

(73) Assignee: LSI Corporation, Milpitas, CA (US)

( * ) Notice: Subject to any disclaimer, the term of this patent is extended or adjusted under 35 U.S.C. 154(b) by 598 days.

(21) Appl. No.: 11/758,975

(22) Filed: Jun. 6, 2007

(65) Prior Publication Data

US 2007/0230621 A1    Oct. 4, 2007

Related U.S. Application Data

(62) Division of application No. 10/429,312, filed on May 5, 2003, now Pat. No. 7,263,470.

(51) Int. Cl.
*H04B 1/69*    (2006.01)
*G06F 1/02*    (2006.01)
*G06F 7/58*    (2006.01)
*H03K 3/84*    (2006.01)

(52) U.S. Cl. .................. 375/130; 708/253; 708/255; 327/146

(58) Field of Classification Search .............. 375/130, 375/131, 139; 703/2; 708/250, 253, 255, 708/256; 327/146
See application file for complete search history.

(56) References Cited

U.S. PATENT DOCUMENTS 3,885,139 A    5/1975    Hurd ........................ 708/252
3,916,285 A *    10/1975    Iwata et al. .................. 363/41
4,218,749 A    8/1980    Babaud et al. ............... 708/253
4,924,711 A *    5/1990    Reilly .................... 73/862.046
4,937,843 A *    6/1990    Takemoto ................... 375/368
6,046,616 A    4/2000    Chan et al.
6,498,577 B1    12/2002    Lin ............................ 341/156
2002/0159590 A1    10/2002    Ikeda ........................ 380/46

* cited by examiner

*Primary Examiner*—Young T. Tse
(74) *Attorney, Agent, or Firm*—David D. Brush; Westman, Champlin & Kelly, P.A.

(57) ABSTRACT

A Gaussian noise is simulated by discrete analogue $r_{i,j}$. A first parameter $\alpha$ and pluralities of first and second integers i and j are selected. A plurality of points i,j are identified and a magnitude $s_{i,j}$ is calculated for each point based on $\alpha$, i and j. The discrete analogue $r_{i,j}$ is based on a respective $s_{i,j}$. Examples are given of $$\alpha = \frac{2^B - A}{2^B}$$

and $D > i \geq 0$ and $2^C > j \geq 0$, where $B \geq 0$, $2^B > A > 0$, $C \geq 1$ and $D \geq 1$, and magnitude $$s_{i,j} = 1 - \alpha^i + \alpha^i \cdot \frac{1-\alpha}{2^C} \cdot j \text{ or } s_{D-1,j} = 1 - \alpha^{D-1} + \alpha^{D-1} \cdot \frac{1}{2^C} \cdot j.$$

In some embodiments, a segment is defined based on $\alpha$ and i. The segment is divided into points based on respective values of j, and the magnitude is calculated for each point of the segment. The defining and dividing segments and calculating the magnitude is iteratively repeated for each value of i.

13 Claims, 2 Drawing Sheets

DIGITAL GAUSSIAN NOISE SIMULATOR

CROSS-REFERENCE TO RELATED APPLICATION

The present application is a divisional of and claims priority from U.S. patent application Ser. No. 10/429,312, filed May 5, 2003, now U.S. Pat. No. 7,263,470, the content of which is hereby incorporated by reference in its entirety.

FIELD OF THE INVENTION

This invention is related to hardware simulation of Gaussian noise, particularly for encoding/decoding in digital communication systems.

BACKGROUND OF THE INVENTION

Gaussian noise generators are employed in a wide variety of applications, including circuit design and testing. For example, one step in the design of semiconductor chips for digital communications systems is the simulation of the encoding/decoding circuits of the system. The physical communications system includes a transport channel to transport encoded information between the encoder and decoder circuits. The transport channel, which may be any type of communications channel, introduces Gaussian noise into the information being transmitted. As a result, the decoder receives a digital signal that represents the encoded digital signal and noise.

FIG. 1 illustrates a basic digital communication system comprising an information source 10, encoder 12, transport channel 14 and decoder 16. Information source 10 generates messages containing information to be transmitted. Encoder 12 converts the message into a sequence of bits in the form of a digital signal S that can be transmitted over transport channel 14. During the transmission over transport channel 14 the original signal S is subjected to noise. Decoder 16 receives a signal S' which represents the original signal S and the noise $n_S$, $S'=S+n_S$, where $n_S$ is a Gaussian noise with zero mean and variance $\sigma^2$.

One approach to simulation of encoder/decoder hardware does not address Gaussian noise at all. Instead, the actual physical transport channel is used to quantify the noise without performing a hardware evaluation of the Gaussian random variable. Another approach, useful for various types of noise, creates a pseudo-random Gaussian noise generator using an inverse function. Examples of pseudo-random Gaussian noise generators are described in U.S. Pat. Nos. 3,885,139 and 4,218,749.

One basic pseudo-random generator $U_k$ is a logical circuit having k outputs, where k=1, 2, 3, . . . . On each clock cycle generator $U_k$ generates some integer value at its outputs. The output value can be one of 0, 1, . . . , $2^k-1$, and the probability P that the output will be any given one of these values is constant and is equal to $2^{-k}$. For example, for any given clock cycle, the probability that generator $U_k$ will provide an output having an integer value I is $P(I)=2^{-k}$, where $0 \leq I \leq 2^k-1$.

SUMMARY OF THE INVENTION

One embodiment of the present invention is a process of simulating noise, such as a Gaussian noise, based on a random variable. A first parameter $\alpha$ and pluralities of first and second integers i and j are selected. In one example, parameters A, B, C and D are selected as $B \geq 0$, $2^B > A > 0$, $C \geq 1$ and $D \geq 1$. $\alpha$ is calculated as $$\alpha = \frac{2^B - A}{2^B},$$

where $1 > \alpha > 0$. Integers i and j are selected such that $D > i \geq 0$ and $2^C > j \geq 0$. A magnitude for each of a plurality of points $s_{i,j}$ is calculated based on $\alpha$, i and j. A discrete analogue $r_{i,j}$ of a random variable is based on a respective $s_{i,j}$.

In preferred embodiments, $s_{i,j}$ is calculated as $$s_{i,j} = 1 - \alpha^i + \alpha^i \cdot \frac{1-\alpha}{2^C} \cdot j$$

for each value of i between D−2 and 0, and as $$s_{D-1,j} = 1 - \alpha^{D-1} + \alpha^{D-1} \cdot \frac{1}{2^C} \cdot j \text{ for } i = D-1.$$

In some embodiments, a segment is defined based on $\alpha$ and a value of i. The segment is divided into points based on respective values of j. The magnitude of each point is calculated, and the process of defining and dividing segments and calculating the magnitude is iteratively repeated for each additional value of i.

In another embodiment, a circuit simulates a noise based on a random variable, such as a Gaussian noise. Each of a plurality of first generators generates a plurality of discrete values. A plurality of comparators, each coupled to a respective one of the first generators, compare the discrete values to a predetermined value, such as A. Each comparator provides an output representative of whether the discrete value from the respective first generator is smaller than A. A selector is responsive to a selected output of a comparator to supply the first integer value i. A second generator generates a second plurality of discrete values j. A memory is responsive to the value of i and respective ones of j to provide an analogue of the random variable.

In preferred embodiments, a third generator generates a sign bit which is combined to the analogue.

In yet other embodiments, a computer program contains computer readable code that causes a computer to perform the process.

DETAILED DESCRIPTION OF THE PREFERRED EMBODIMENTS

The present invention is directed to a process and apparatus for hardware simulation of Gaussian noise $n_S$.

It will be appreciated that if n is a Gaussian noise with zero mean and variance 1, a Gaussian noise $n_S$ with zero mean and variance $\sigma^2$ can be created as $n_S = \sigma \cdot n$. For any given value x, the probability that n is smaller than x is denoted by P(n<x) and is $$P(n<x) = \frac{1}{\sqrt{2\pi}} \int_{-\infty}^{x} e^{-t^2/2} dt.$$

In accordance with the present invention, Gaussian noise n is simulated by evaluating members of the set of Gaussian noise as $$|n| = \begin{cases} n & n \geq 0 \\ -n & n < 0, \end{cases}$$

and evaluating the sign $s_n$ of n as $$s_n = \begin{cases} 1 & n \geq 0 \\ -1 & n < 0. \end{cases}$$

Then, $n = s_n \cdot |n|$.

Prior pseudo-random generators calculated a pseudo-random approximation of variable $|n|$ using an inverse function. For any given $x \geq 0$, the probability that $|n|$ is smaller than x is $$P(|n|<x) = \sqrt{\frac{2}{\pi}} \cdot \int_{0}^{x} e^{-t^2/2} dt.$$

Figures 1, 2:
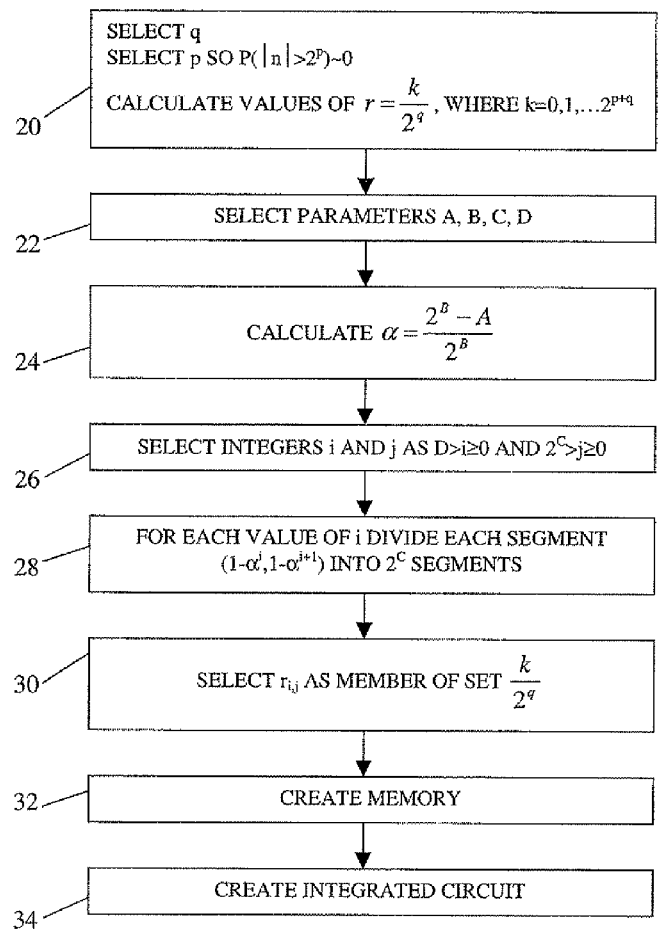
FIG. 1 is a block diagram of a typical digital communications system.
FIG. 2 is a flowchart of a process of creating an integrated circuit of a noise generator in accordance with an embodiment of the present invention.

The present invention evaluates a discrete analogue r of the Gaussian noise $|n|$. Thus, instead of random variable $|n|$, the discrete analogue (or discrete approximation) r of the random variable $|n|$ is considered. More particularly, a uniform random variable s is selected that belongs to the interval (0,1). The value of s varies logarithmically over the interval, rather than linearly so that the value of neighboring points change exponentially. The inverse function may then be applied to the values of each point. FIG. 2 is a flow diagram illustrating the steps of the process of simulating Gaussian noise according to the present invention.

At step 20, values of p and q are selected. The analogue r being calculated is a pseudo-random variable that is analogous to $|n|$ and can take values of $$\frac{k}{2^q},$$

where $k=0, 1, \ldots, 2^{p+q}-1$. For $k=0, 1, \ldots, 2^{p+q}-2$, the probability that the value of r is a given one of the values $$\frac{k}{2^q}$$

is $$P\left(r = \frac{k}{2^q}\right) = \sqrt{\frac{2}{\pi}} \cdot \int_{k/2^q}^{(k+1)/2^q} e^{-t^2/2^q} dt.$$

For $k=2^{p+q}-1$, the probability that r is a given one of the values $$\frac{k}{2^q}$$

is $$P\left(r = \frac{2^{p+q}-1}{2^q}\right) = 1 - \sum_{k=0}^{2^{p+q}-2} P\left(r = \frac{k}{2^q}\right).$$

In selecting values for p and q, the value p is chosen so that the probability $P(|n|>2^p)$ is close to zero. In most cases, $p=3$, 4 or 5, so the probability is nearly zero that $|n|$ exceeds 8 (where $p=3$), 16 (where $p=4$) or 32 (where $p=5$). The value of q is chosen as large as practical, and is limited by the size of the binary word forming $$\frac{k}{2^q}$$

and the capacity of the memory created by the hardware implementation of the process. The magnitude $$\frac{1}{2^q}$$

is an expression of the accuracy of approximation, or difference, of variable r to random variable $|n|$. As q increases in value, the variance represented by $$\frac{1}{2^q}$$

decreases in value and variable r more closely approximates random variable $|n|$. The values $$\frac{k}{2^q},$$

$k=0, 1, \ldots, 2^{p+q}-1$, are expressed by (p+q) binary digits $k_0, k_1, \ldots, k_{p+q}-1$ so that $$\frac{k}{2^q} = \frac{1}{2^q} \cdot \sum_{i=0}^{p+q-1} 2^i \cdot k_i.$$

At step 22, four parameters, A, B, C and D, are selected. Parameter B is a positive value, $B \geq 0$, parameter A is a positive value between $2^B$ and zero, $2^B > A > 0$, and parameters C and D are positive values greater than 0, $C \geq 1$ and $D \geq 1$. At step 24, $\alpha$ is calculated as $$\alpha = \frac{2^B - A}{2^B}.$$

Thus, $1 > \alpha > 0$. At step 26, integers i and j are selected such that $D > i \geq 0$ and $2^C > j \geq 0$. At step 28, for each value of i smaller than D−1 (i.e., $(D-1) > i \geq 0$) segment $[1-\alpha^i, 1-\alpha^{i+1}]$ is split into $2^C$ smaller segments, each based on a value of j, and a magnitude $s_{i,j}$ is calculated for each smaller segment as $$s_{i,j} = 1 - \alpha^i + \alpha^i \cdot \frac{1-\alpha}{2^C} \cdot j.$$

Each smaller segment has a length equal to $$\alpha^i \frac{1-\alpha}{2^C}.$$

For example, for i=0, points $s_{0,j}$ split segment $[0, 1-\alpha]$ into $2^C$ smaller segments each having equal length $$\frac{1-\alpha}{2^C}.$$

Each point between 0 and $(1-\alpha)$ has a value $$s_{0,j} = \frac{1-\alpha}{2^C} \cdot j,$$

where $2^C > j \geq 0$. For i=1, and points $s_{1,j}$ split segment $[1-\alpha, 1-\alpha^2]$ into $2^C$ smaller segments of equal length $$\alpha \frac{1-\alpha}{2^C}.$$

Each point between $(1-\alpha)$ and $(1-\alpha^2)$ has a value $$s_{1,j} = 1 - \alpha + \alpha \cdot \frac{1-\alpha}{2^C} \cdot j.$$

For i=D−2, points $s_{(D-2),j}$ split segment $[1-\alpha^{D-}, 1-\alpha^{D-1}]$ into $2^C$ smaller segments of equal length $$\alpha^{D-2} \cdot \frac{1-\alpha}{2^C},$$

each having a value $$s_{D-2,j} = 1 - \alpha^{D-2} + \alpha^{D-2} \cdot \frac{1-\alpha}{2^C} \cdot j$$

In the case of i=D−1, segment $[1-\alpha^{D-1}, 1]$ is also split into $2^C$ smaller segments, each based on a value of j, and a magnitude $s_{D-1,j}$ is calculated for each smaller segment as $$s_{D-1,j} = 1 - \alpha^{D-1} + \alpha^{D-1} \cdot \frac{1}{2^C} \cdot j.$$

Each smaller segment has a length equal to $$\alpha^{D-1} \frac{1}{2^C}.$$

It will be appreciated that the segments together embrace an interval (0,1), and that the length of neighboring segments exponentially decreases. For example, if $\alpha=0.5$, segment $[0, 1-\alpha]$ embraces a length of 0.5 of the interval and is divided into $2^C$ smaller segments; segment $[1-\alpha, 1-\alpha]$ has a length of 0.25 which is also divided into $2^C$ smaller segments; etc. Since each smaller segment has a value $s_{i,j}$, it is evident that the distance between neighboring points $s_{i,j}$ decreases exponentially across the interval (0,1) as the segments decrease in length. Thus, instead of using uniform distances between points to calculate inverse functions, as in prior noise simulators, the present invention employs exponentially varying distances between points.

At step 30, an inverse function $inv(s_{i,j})$ is calculated for each magnitude $s_{i,j}$ such that the probability that $inv(s_{i,j})$ is smaller than $|n|$ is equal to $s_{i,j}$, $P(|n| < inv(s_{i,j})) = s_{i,j}$. Expressed another way, $$s_{i,j} = \sqrt{\frac{2}{\pi}} \cdot \int_0^{inv(s_{i,j})} e^{-t^2/2} dt.$$

The number r is selected as the nearest number to inv(s). Therefore, each $r_{i,j}$ is a number closest to the corresponding $inv(s_{i,j})$ and is member of the set of $$\frac{k}{2^q}$$

for all values of k=0, 1, . . . , $2^{p+q}-1$.

$$r_{i,j} \in \left\{ \frac{k}{2^q} \,\middle|\, k = 0, 1, \ldots, 2^{p+q} - 1 \right\}.$$

At step 32 a memory is constructed. In one form, the memory may comprise a module MEM comprises a table that stores all the values $r_{i,j}$, for $D > i \geq 0$ and $2^C > j \geq 0$. Module MEM will require (p+q) bits to store each variable $r_{i,j}$, so the total capacity of memory MEM is $D \cdot 2^C \cdot (p+q)$ bits. In other embodiments, the memory constructed at step 32 is a logical module LOG_MEM having two inputs i,j to calculate the magnitude $r_{i,j}$ by executing steps 28 and 30 using the i and j input values.

It will be appreciated that in either case the constructed memory will have fixed values of parameters A, B, C and D, thus fixing the binary sizes of i and j and the value of $\alpha$. Consequently, a memory module MEM may comprise a lookup table correlating values of $r_{i,j}$ to inputs i and j. A memory module LOG_MEM may store fixed values of α and $$\frac{1-\alpha}{2^C},$$

and calculate $s_{i,j}$ based on inputs i and j and the stored values of α and $$\frac{1-\alpha}{2^C}.$$

Such a LOG_MEM would correlate the calculated $s_{i,j}$ to discrete values of $r_{i,j}$.

Figure 3:
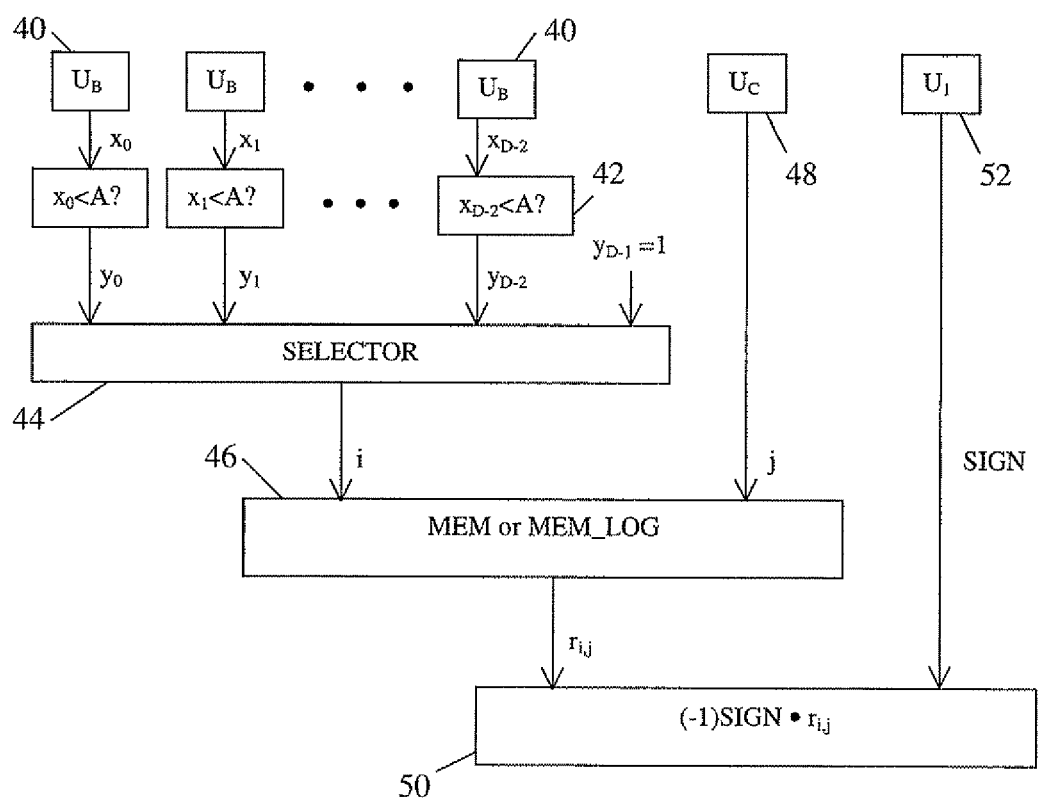
FIG. 3 is a block diagram of an integrated circuit implementing a noise generator according to one embodiment of the invention.

At step 34, an integrated circuit is created to generate a pseudo-random Gaussian noise. The circuit is illustrated in FIG. 3, and comprises (D−1) $U_B$ generators 40 each generating a respective variable $x_i$ representing one of $x_0$, $x_1$, ..., $x_{D-2}$ and having a uniformly-distributed pseudo-random value 0, 1, ..., $2^B$−1. The circuit also includes (D−1) comparators 42 that compares the value of $x_i$ to A. The value of the output $y_i$ of a comparator 42 is logical 1 if and only if the value of the input $x_i$ is less than A.

Logical selector 44 has D inputs, designated $y_0$, $y_1$, ..., $y_{D-1}$. Inputs $y_0$, $y_1$, ..., $y_{D-2}$ are supplied by respective comparators 42. The value of the input $y_{D-1}$ is set to logical 1. Selector 44 calculates value i based on the minimum $y_i$=1. For example, if $y_0$ and $y_1$ both equal 0 and $y_2$=1, i is integer 2 and is represented by a logical 1 at the $y_2$ input. Thus, if D=16, selector will supply a 4-bit representation of i, so for i=2, selector 44 will supply "0100" to memory 46.

The value of i is supplied to the memory 46 created at step 32 (FIG. 2). $U_C$ generator 48 generates a value j as $2^C$<j≦0 and supplies that value to memory 46. For example, if C=12, generator 48 supplies a 12-bit representation of j. Memory 46 selects or calculates a value of $r_{i,j}$ based on the values of i and j, and supplies the selected $r_{i,j}$ to sign module 50. More particularly, if memory 46 is a table (e.g., MEM) that correlates values of i and j to $r_{i,j}$, the value of $r_{i,j}$ is selected and output to sign module 50. If memory 46 is a logical module (e.g., LOG_MEM), memory 46 contains logic that defines and splits segments into $2^C$ smaller segments, calculates $s_{i,j}$ for each smaller segment, and calculates $r_{i,j}$ as a number closest to the corresponding inv($s_{i,j}$), as described in connection with steps 28 and 30 in FIG. 2.

$U_1$ Generator 52 supplies a 0 or 1 bit to module 50 to select a sign, positive or negative, to value $r_{i,j}$. The sign $s_n$ is evaluated as $(-1)^{u_1}$, where $u_1$ is a pseudo-random variable generated by pseudo-random generator 52 that provides values 0 and 1 with a probability of 0.5 (that is, the probability, $P(u_1)$, that generator 52 will provide a given value 0 or 1 is 0.5). For example, the value of value $r_{i,j}$ is multiplied by −1 if generator 52 supplies a 0 bit. Thus, variable r is generated by the integrated circuit of FIG. 3 for the pseudo-random Gaussian noise.

The selection of the values of parameters A, B, C and D is based on the characteristics (area, delay, etc.) of the integrated circuit in which the noise generator is implemented. Generally, greater values of B, C and D and smaller values of A increases the accuracy of approximation of the Gaussian random variable by the discrete analogue r. Generally, preferred choices of parameter values are:

1) $C \geq q$;

2) $\frac{\alpha^{D-1}}{2^C} \leq \frac{e^{-2^{2p-1}}}{2^q}$, where $\alpha = \frac{2^B - A}{2^B}$.

For example, for p=3 and q=10, optimal results are achieved by choosing parameters as A=B=1, D=16 and C varies between 10 and 12.

In preferred embodiments the process of the invention is carried out in a computer under the control of a computer program having computer readable program code for causing the computer to carry out the process steps. A memory medium, such as a recording disk of a disk drive, has the computer readable program therein to receive the i and j inputs and define or contain the parameters to carry out the computer processes of the invention.

Although the present invention has been described with reference to preferred embodiments, workers skilled in the art will recognize that changes may be made in form and detail without departing from the spirit and scope of the invention.

What is claimed is:

1. An integrated circuit for simulating a noise based on a random variable comprising:
    a plurality of first generators each capable of generating a first plurality of discrete values;
    a plurality of comparators, each comparator coupled to a respective one of the first generators to compare a discrete value generated by the respective first generator to a predetermined value, each comparator providing an output representative of whether the discrete value generated by the respective first generator is smaller than the predetermined value;
    a selector responsive to a selected output of at least one of the comparators to supply a first integer value;
    a second generator capable of generating a second plurality of discrete values; and
    a memory responsive to the first integer value and respective ones of the second plurality of discrete values to provide a discrete analogue of the random variable.

2. The integrated circuit of claim 1, further including
    a third generator for generating a bit representative of a sign, and
    a sign indicator for applying the sign representation to the discrete analogue.

3. The integrated circuit of claim 2, wherein the bit representative of the sign is evaluated as $(-1)^{u_1}$, where $u_1$ is a pseudo-random variable generated by the third generator that provides values 0 and 1 with a probability of 0.5.

4. The integrated circuit of claim 1, wherein the selector has D inputs and supplies the first integer value i, at least D−1 of which are from respective comparators, and the second generator generates $2^C$−1 discrete values j, and wherein the memory is constructed to identify a magnitude for each of a plurality of points $$s_{i,j} = 1 - \alpha^i + \alpha^i \cdot \frac{1-\alpha}{2^C} \cdot j,$$

where $$\alpha = \frac{2^B - A}{2^B}$$

and A, B, C and D are integers.

5. The integrated circuit of claim 4, wherein each first generator generates $2^B$ discrete values, and each comparator compares the discrete value to A.

6. The integrated circuit of claim 1, wherein the plurality of first generators comprises D−1 first generators, where D is an integer and each of the D−1 first generators generates respective discrete values $x_i$ representing one of $x_0, x_1, \ldots, x_{D-2}$ and having a uniformly-distributed pseudo-random value.

7. The integrated circuit of claim 1 wherein the first and second generators comprise pseudo-random generators.

8. An integrated circuit for simulating a noise based on a random variable comprising:
a plurality of first pseudo-random generators, each generating a pseudo-random discrete value;
a plurality of comparators, each comparator coupled to a respective one of the first generators to compare the discrete value generated by the respective first generator to a predetermined value, each comparator providing an output representative of a comparison between a magnitude of the discrete value generated by the respective first generator and the predetermined value;
a selector responsive to the output of at least one of the comparators to supply a first integer value;
a second pseudo-random generator capable of generating a further pseudo-random discrete value; and
a memory responsive to the first integer value and the further pseudo-random value to provide a discrete analogue of the random variable.

9. The integrated circuit of claim 8, further including
a third generator for generating a bit representative of a sign, and
a sign indicator for applying the sign representation to the discrete analogue.

10. The integrated circuit of claim 9, wherein the bit representative of the sign is evaluated as $(-1)^{u_1}$, where $u_1$ is a pseudo-random variable generated by the third generator that provides values 0 and 1 with a probability of 0.5.

11. The integrated circuit of claim 8, wherein the selector has D inputs and supplies the first integer value i, at least D−1 of which are from respective comparators, and the second generator generates $2^C-1$ discrete values j, and wherein the memory is constructed to identify a magnitude for each of a plurality of points $$s_{i,j} = 1 - \alpha^i + \alpha^i \cdot \frac{1-\alpha}{2^C} \cdot j,$$

where $$\alpha = \frac{2^B - A}{2^B}$$

and A, B, C and D are integers.

12. The integrated circuit of claim 11, wherein each first generator generates $2^B$ discrete values, and each comparator compares the pseudo-random discrete value to A.

13. The integrated circuit of claim 8, wherein the plurality of first generators comprises D−1 first generators, where D is an integer and each of the D−1 first generators generates respective pseudo-random discrete values $x_i$ representing one of $x_0, x_1, \ldots, x_{D-2}$ and having a uniformly-distributed pseudo-random value.

* * * * *